United States Patent
Probin et al.

(10) Patent No.: US 10,140,844 B2
(45) Date of Patent: Nov. 27, 2018

(54) SMART DEVICE DISTRIBUTED SECURITY SYSTEM

(71) Applicant: Honeywell International Inc., Morris Plains, NJ (US)

(72) Inventors: Robert J. Probin, Glasgow (GB); Martin Crisp, Motherwell (GB); William J. Brown, Glasgow (GB)

(73) Assignee: Honeywell International Inc., Morris Plains, NJ (US)

( * ) Notice: Subject to any disclaimer, the term of this patent is extended or adjusted under 35 U.S.C. 154(b) by 99 days.

(21) Appl. No.: 15/233,462

(22) Filed: Aug. 10, 2016

(65) Prior Publication Data
US 2018/0047279 A1  Feb. 15, 2018

(51) Int. Cl.
G08B 1/08 (2006.01)
G08B 25/10 (2006.01)
G08B 25/00 (2006.01)
H04L 29/08 (2006.01)
H04W 4/16 (2009.01)

(52) U.S. Cl.
CPC .......... *G08B 25/10* (2013.01); *G08B 25/008* (2013.01); *H04L 67/12* (2013.01); *H04W 4/16* (2013.01)

(58) Field of Classification Search
CPC ....... G08B 25/10; G08B 25/008; H04L 67/12; H04W 4/16
USPC ....... 340/539.11, 501, 541; 455/404.1, 414.1
See application file for complete search history.

(56) References Cited

U.S. PATENT DOCUMENTS

| | | | |
|---|---|---|---|
| 7,580,395 B2 | 8/2009 | Boatwright et al. | |
| 7,762,470 B2 | 7/2010 | Finn et al. | |
| 8,179,256 B2 * | 5/2012 | Crisp | G08B 25/08 340/541 |
| 8,289,161 B2 | 10/2012 | Hosey | |
| 8,898,750 B2 | 11/2014 | Dattagupta et al. | |
| 9,082,119 B2 | 7/2015 | Ortiz et al. | |
| 9,858,805 B2 * | 1/2018 | McLaughlin | G08C 17/02 |
| 2003/0166360 A1 | 9/2003 | Thornton et al. | |
| 2012/0226827 A1 | 9/2012 | Raju et al. | |

(Continued)

FOREIGN PATENT DOCUMENTS

| | | |
|---|---|---|
| CA | 2813983 A1 | 10/2013 |
| EP | 2639780 A2 | 9/2013 |

(Continued)

OTHER PUBLICATIONS

The Extended European Search Report for EP Application No. 17185613.1, dated Nov. 24, 2017.

(Continued)

*Primary Examiner* — Dhaval Patel
(74) *Attorney, Agent, or Firm* — Seager, Tufte & Wickhem LLP (57) ABSTRACT

A security system incorporating one or more sensors and one or more smart devices connected together via the Internet, other network or media. The one or more smart devices may have an alarm application (app) that permits a user to set and unset an alarm, monitor a status change of an event, have access to video information associated with the event, take remote or local action relative to the event, and more. The processing may be more than moving processing to one smart device. Core control may reside in more than one device, and thus result in a whole system robustness.

19 Claims, 8 Drawing Sheets

(56) References Cited

U.S. PATENT DOCUMENTS

| | | |
|---|---|---|
| 2013/0285799 A1 | 10/2013 | Probin et al. |
| 2014/0279552 A1 | 9/2014 | Ortiz et al. |
| 2014/0281742 A1 | 9/2014 | Probin |
| 2014/0313048 A1 | 10/2014 | Sabata et al. |
| 2014/0320312 A1 | 10/2014 | Sager et al. |
| 2015/0065078 A1* | 3/2015 | Mejia .................. G08B 17/00 |
| | | 455/404.1 |
| 2015/0186879 A1 | 7/2015 | Ortiz et al. |
| 2015/0339912 A1* | 11/2015 | Farrand ................ G08B 25/00 |
| | | 340/501 |
| 2016/0012713 A1 | 1/2016 | Siwak et al. |
| 2016/0093180 A1 | 3/2016 | Fitzgibbon et al. |
| 2016/0149720 A1* | 5/2016 | Hatae ............... G08B 13/19658 |
| | | 455/414.1 |

FOREIGN PATENT DOCUMENTS

| | | | |
|---|---|---|---|
| WO | 2007060547 | A2 | 5/2007 |
| WO | 2014053010 | A1 | 4/2014 |

OTHER PUBLICATIONS http://www.eyefi.com/products/mobi-pro, "Mobi Pro. The Ultimate WiFi SD Card," 6 pages, printed Oct. 31, 2015.
https://www.hyperstone.com/Security_en,1176html, "Hyperstone Security Solutions," 1 page, printed Apr. 14, 2017.
Samsung Electronics, "K9XXG08UXM Preliminary Flash Memory," 39 pages, downloaded Apr. 14, 2017.
U.S. Appl. No. 15/424,647, filed Feb. 3, 2017.

* cited by examiner

SMART DEVICE DISTRIBUTED SECURITY SYSTEM

BACKGROUND

The present disclosure pertains to smart devices and security systems.

SUMMARY

The disclosure reveals a security system incorporating one or more sensors and one or more smart devices connected together via the Internet, other network or media. The one or more smart devices may have an alarm application (app) that permits a user to set and unset an alarm, monitor a status change of an event, have access to video information associated with the event, take remote or local action relative to the event, and more. The processing may be more than moving processing to one smart device. Core control may reside in more than one device, and thus result in a whole system robustness.

DESCRIPTION

The present system and approach may incorporate one or more processors, computers, controllers, user interfaces, wireless and/or wire connections, and/or the like, in an implementation shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

For low cost, self-monitored systems (possibly self-installed "DIY" systems), some solutions may use a local control panel (which might also be a gateway) and servers (stand-alone or in a cloud) in addition to user applications on mobile phones and desktop computers and PCs. However, there may be an opportunity for user-centric model leveraging advances in technology in the areas of Internet connected devices (such as intrusion sensors), advances in connectivity and that advances in the processing power of portable smart devices such as smart phones. The present solution has a lower initial cost and reduces the hardware that needs to be installed and supported on site.

A smart device may be an electronic device connected to other devices or networks via different protocols, which can operate to some extent interactively and autonomously. Examples of smart devices may incorporate smartphones, phablets and tablets, smartwatches, smart bands and smart key chains.

An instance of a smart device may be a smartphone that is a mobile phone with an advanced mobile operating system, which combines features of a personal computer operating system with other features useful for mobile or handheld use. Smartphones may combine the features of a cell phone, such as the ability to receive and make phone calls, with features of other digital mobile devices. Other features may include a personal digital assistant (PDA) for making appointments in a calendar, web browser, media player, video games, GPS navigation unit, digital camera, digital video camera, and so forth. A smartphone may access the Internet and run third-party software components (e.g., apps). They may have a color touchscreen graphical user interface that often covers seventy percent or more of the front surface with an LCD, OLED, AMOLED, LED or similar screen.

The present approach may simplify the implementation of low cost, self-monitored systems by reducing the number of physical elements on site. A system in its basic form may be one Internet (or other network) connected sensor and one application running on an Internet-connected (or other network connected) smart device (e.g., mobile phone).

In one form, the sensor may be made up of a standard sensor, an Internet (or other network) connection and perhaps some basic additional processing (e.g., knowing the set status of the system).

A smart device app may allow the user to set and unset an alarm system, remain constantly in contact with any sensor on a predetermined system, monitor for any change in state that needs to be acted upon by the user (e.g., an intrusion event, a fire, or a power outage), allow the user to access associated video/audio signals, and take some action remotely either automatically or triggered by the user, e.g., ring a bell, call emergency services, call police, broadcast a message to a site, record images, and the like.

The present system may be scalable based on a number of Internet (or other network) connected sensors and a number of smart devices (users) that are added to the system. A feature of the present solution may be an ability of each of the system components (either sensors or smart devices) to continuously synchronize with the other sensors and devices to ensure that the system remains robust and that there is some redundancy in alarm processing, e.g., each of the apps being capable of triggering remote action, which would then be communicated to the other devices.

An example of a present solution may be an alarm system involving key components. First, there may be one or more Internet (or other network) connected intrusion sensors (e.g., movement, door open, glass breakage, and so forth) and other security related devices, like an Internet-connected video camera, audio devices, and so on. These devices may contain enough functionality to allow them to form an on-premise network where each device contains up-to-date system information, e.g., the set status of the system and details of virtually all associated users.

There may be one or multiple apps running on one or more smart phones or equivalents. Each app may be capable of running alarm processing, i.e., monitoring messages from one or more sensors and notifying the one or more users when an event is triggered. The one or more users may be allowed to take action. There may be synchronizing with other apps connected to the system.

Some smart phones or devices might have control over the system (thereby acting as a primary device); others might just be helpers when the primary smart phones/devices cannot be accessed.

Control may be as in "control system logic" rather than just control used in the sense of "user-interface setting element". In temperature controls for rooms, this may be a difference between an actual boiler logic module and the room control dial. That is, "control" may be meant in the sense of the intelligence or logic of the system not necessarily at the site in a "control panel" (as may be typical with burglar/intrusion and access systems) but actually in something which, up till today, has just been used as a "UI device" for security systems, such as a smart phone or tablet.

As shown herein, one may also go further than just moving this processing to a single smart device. It is shown how this core control may reside in more than one device, and thus create whole system robustness.

The present system may be an alarm system on a "mobile app". It may use a portable smart device (like a phone) to run the system. It may also be run on a wearable device, or other mobile or relocatable device (e.g., like a portable lap- or plug-top computer).

Figure 4:
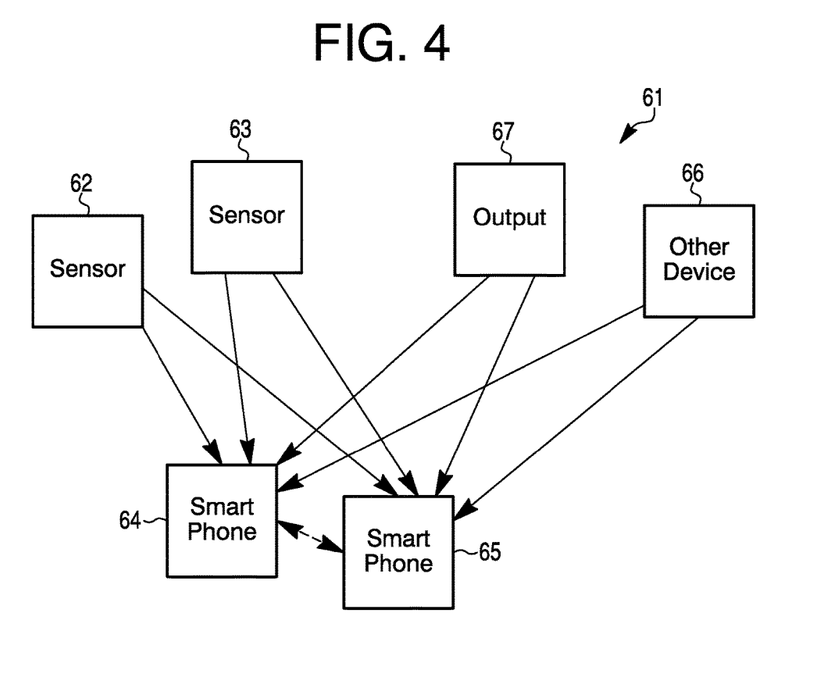
FIG. 4 is a diagram of a logical overview of an example of the present system.
Figure 5:
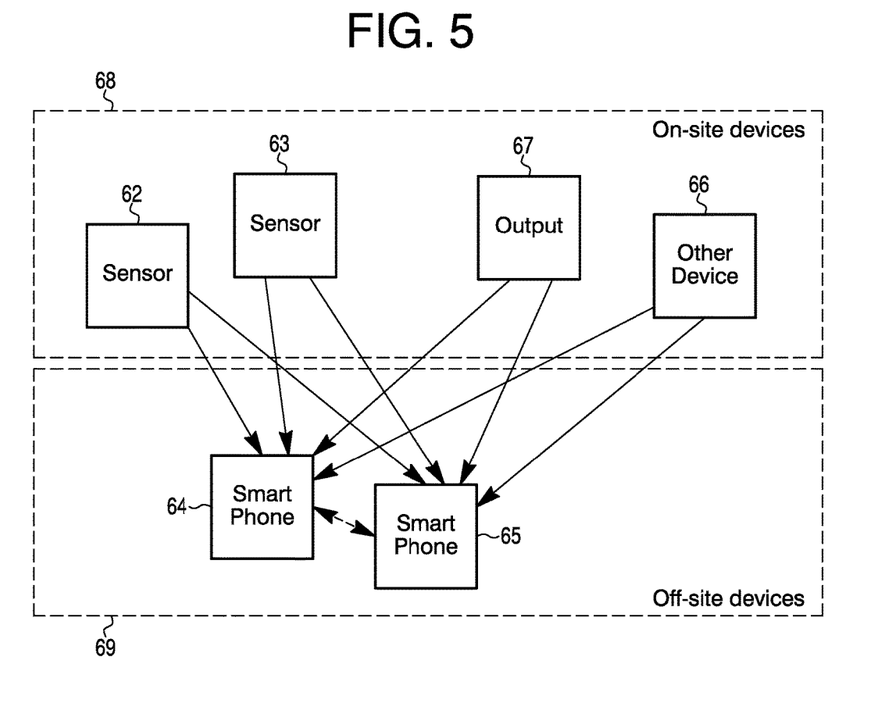
FIG. 5 is a diagram of an example of the system like that of FIG. 4 but with a delineation of on-site devices and off-site devices.

Sensors may communicate with a mobile app. FIGS. 4 and 5 may show an example system overview (logical view), theoretical view, and a view without optimizations.

Key characteristics may incorporate a self-monitored system primarily. One may add professional monitoring on a temporary or backup or, depending upon a decision for business, supplying the monitoring.

System capabilities may incorporate a collection of "site devices" made up of one or more sensors (on site), zero or more outputs (on site), zero or more other devices (on site), and one or more smart devices or other equivalent (devices anywhere). In the diagrams of the Figures noted herein, this may be shown as, for example, a "smartphone" or a "tablet". Smart devices may manage one or more sites.

Figure 6:
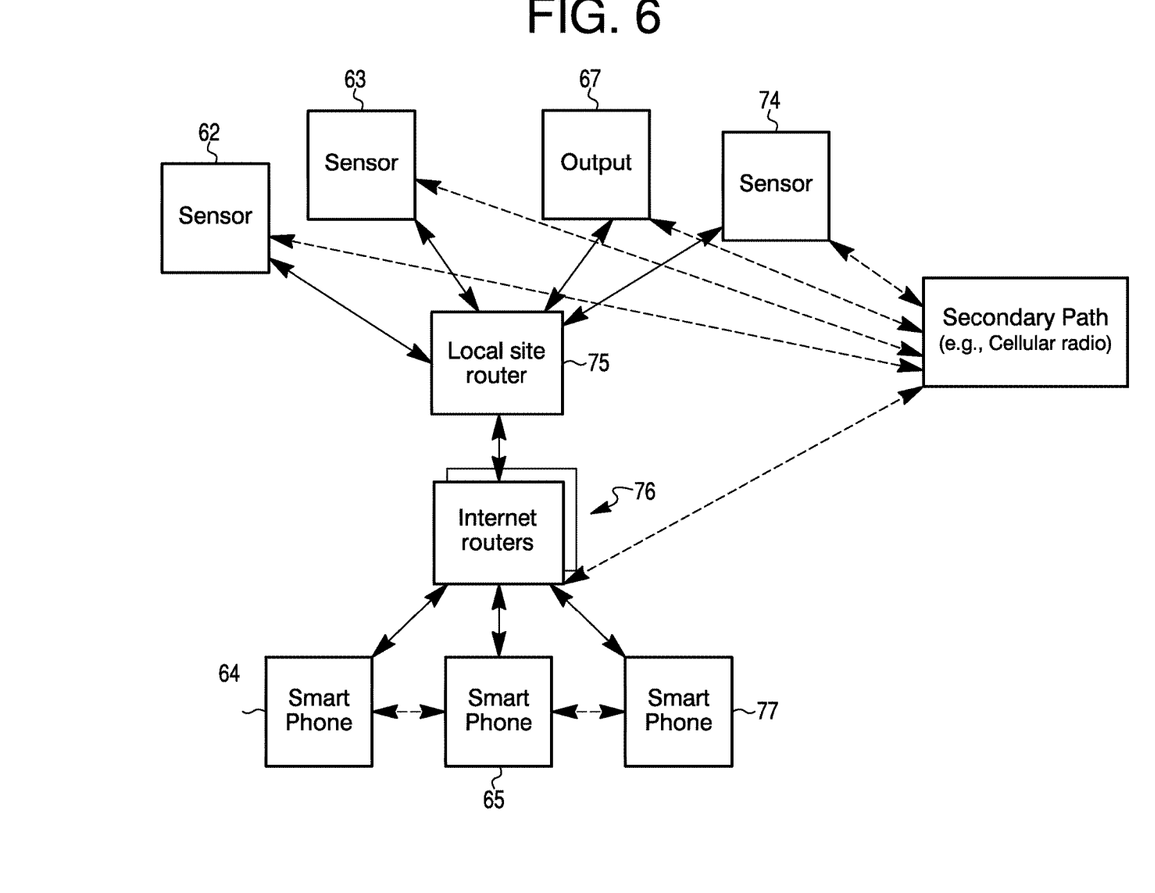
FIG. 6 is a diagram of a physical overview an example of the present system.
Figure 7:
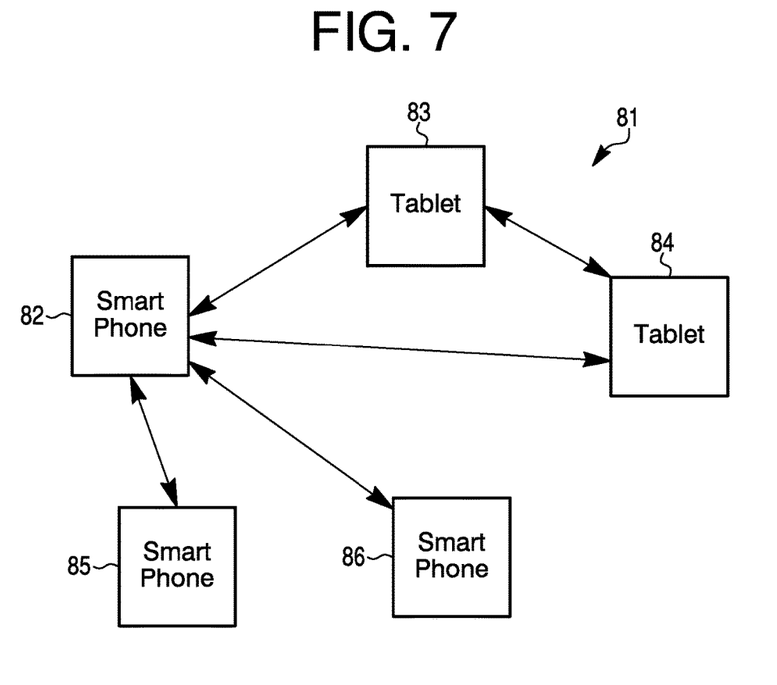
FIG. 7 is a diagram of a smart device view of the present system without sensor or output communication.

FIG. 6 is a diagram of an example system overview (physical view). FIG. 7 is a diagram of a smart device view, ignoring sensor/output communication.

Figure 8:
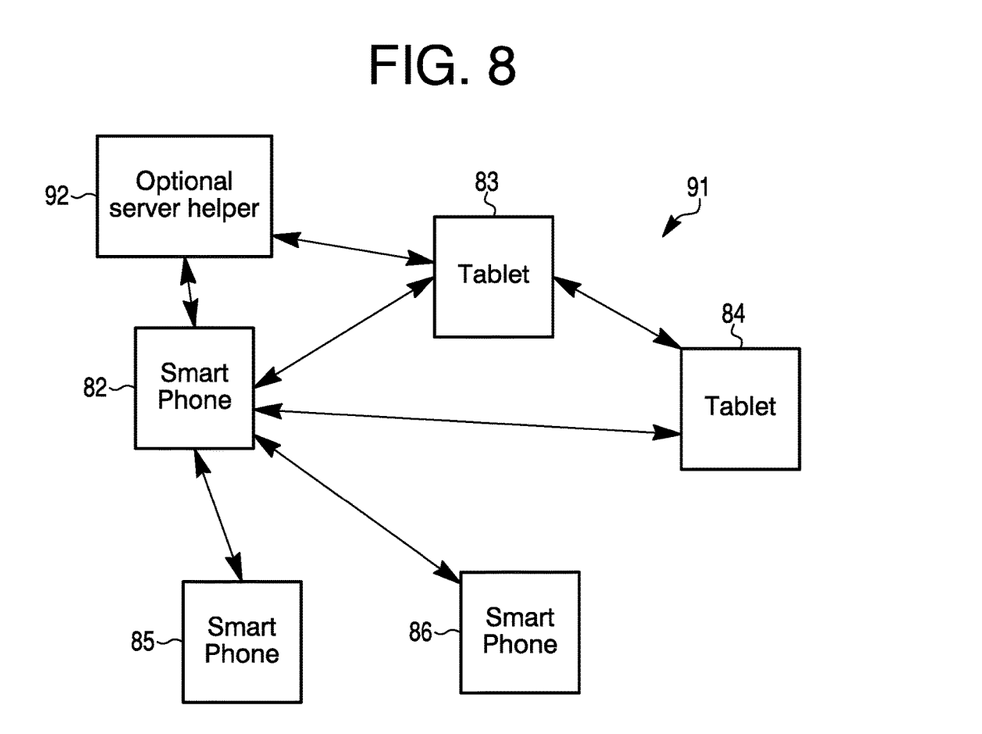
FIG. 8 is a diagram of the smart device view, incorporating an optional server, but without sensor or output communication.

FIG. 8 is a diagram of a smart device view, including an optional server, but ignoring sensor/output communication. Primary devices and helper devices may be noted. Smart devices may be broken down into two types, that is, primary devices and helper devices.

A primary device may be a main processor of information. It may be "preferred" by site devices as a first device where to send signal information. The primary device may have an authority on determining an order of events when there is a conflict.

Primary device responsibilities ("what it does") may incorporate monitoring events from sensors, allowing users with sufficient access rights to alter the system configuration and add helper devices.

A helper device may provide backup when no primary devices are available. A helper device's responsibilities may be the same as those of primary devices except it cannot provide an authority on order of events (in the presence of a primary device) and cannot have administrator control over any system configuration.

Commercial issues of some systems may involve a significant cross section of home owners that fall into one or more of the following categories (with regards to alarm systems). Some home owners may have a level of fear of using a system in that "you are given 30 seconds to disarm the system and if you don't, all heck will break loose". Some home owners may not want to pay a large fee to install a system (they would prefer a DIY or at least to be able to install it in under an hour). Some may not want to pay large monthly fees to own and run a system. Some may want to self monitor the system if possible. Some home owners may see an alarm system as a grudge purchase. Some owners are unfamiliar with user interfaces. Some already have a number of electronic devices in their possession and do not particularly want any more (especially if they have to learn how to use them). Some owners may see permanently switched on products as a waste of energy. Burglar alarms may be seen as low tech items.

Technical challenges may be noted. There appears a need to provide the following technical solutions. The system should have equipment easy to install equipment in a DIY environment, be easily maintained, be low cost, have reuse of standard equipment that is already available in the home, have a user interface that is familiar and yet perceived as high tech (e.g., a smart phone), be straightforward (or at least exude familiarity) relative to an access of features (e.g., a standard smart phone operating system (OS)), and so forth.

Any main powered devices may be taken out of the system. Alarm systems may be "permanently on". There may be an integration of the alarm system into another already active product.

Features of the present system may incorporate the hardware that stores and runs the system, firmware or software that is located on a smart phone (or an equivalent device), and reuse of end-users existing technology—that is already familiar and is "recent technology", and redundancy of the main processing unit may be built into the entire system design and thus removing a current intruder system weakness at a minimal cost.

Additional features noted in the system may involve virtually all user, zone, tamper, and so on, data passed via one or multiple communication paths from the installation site to a mobile application limited to or no system control actually located on the installation site, all system related firmware/software located in the mobile application, system firmware/software being updated as per the established method for the mobile application, applications being downloaded from a company's website or from existing third party app stores, common peripherals across all product lines (i.e., sensor, communications modules, user interface modules, PSUs, and so forth), the manufacturer warehouse is just required to carry a common set of peripherals, the installer merely needs to carry a common set of peripherals, may be considered as a greener approach to security and sold as such (less permanently powered-up modules in one's system), and a user may have full control of the system and can therefore disarm the system before entering the house (taking away some of the fear of using the system).

Example sensor types may incorporate motion detectors (PIR, window/door sensors), and video cameras with build-in motion detection.

Devices may optimize communications between or among smart devices (phones, tablets, and so on) and on-site devices.

The present system may be a distributed system but should be able to merge updates from multiple sources and destinations with (at most) $(n*m)+(n*(n-1)/2)$ communication paths in a linear history without human interaction, where m is number of site devices (sensors/outputs), n is the number of smart devices.

Timestamps may be used to help with the present approach. Time between devices may be synchronized with computing techniques. The number of connections may exclude the optimization of initial communications going to the primary node. All events from a single site device may also have a monotonic count, and the history reconstruction may just need to happen at smart devices. Site devices do not necessarily need an order to operate.

The system may have additional features. A "message server" may be an addition to present main system. It may help getting data around in that phones which cannot receive incoming connections can periodically check in with the message server to receive messages. The message server may also implement a "push" service to get data to a phone. Data may be routed from sensors to multiple places. The server may be just data transport, and thus need no logic in that it may effectively be just a specialist router.

It may be entirely possible that all (or some) sensors may implement a push server, negating the need for a separate server. A tracker for systems may provide service that allows finding authorized systems quickly. The tracker is not necessarily required once a local system to phone connection is established. The tracker may allow for Internet or Network-based servers or a cloud.

A primary app and a helper app may be features of the present system. A temporary helper app may give someone trusted temporary access and (optionally) have one's device run the system as well.

Auxiliary cloud service may be a helper. If all devices are not contactable, the service may act as a fall back system. It may be a chargeable service on a per-day, month, one-off, or recurring fee, depending upon current business requirements.

Sensors may have a set state. Optionally, there may be sensors that have a set (armed) state. The set state might be just to avoid unnecessary transmissions when unset. System phones communicating with each other for set/unset might be avoided. Sensors do not necessarily need non-volatile storage.

The primary sensor may do some on-site coordination. It may have extra storage, and act as a communication gateway or router if necessary.

Routers may be noted. A local site router may effectively be an implementation of details that is transparent to the system. Some types of local site routers may be of interest. One may be a local gateway (i.e., an inter-network) router that routes IP packets to a destination. This may be an application router. It may receive messages from non-Internet routable protocols and translate them. It may receive messages from multiple sensors and act as a multi-cast device, sending single messages to multiple smart-devices.

An Internet multicast (IPv4) may be blocked or not necessarily configured in many places. Another Internet multicast may be easier because of unicast-prefix-based IPv6 multicast addresses. It may be unknown whether a multicast will be blocked.

A use case may incorporate a security system (intrusion/burglary), home automation, audio/visual entertainment control, access, video, home heating control, internal temperature control, lighting, bell/door/video door phone, fish feeding, monitoring, internal and external temperature monitoring, and external (garden/grounds) monitoring.

A self-monitoring example may be where a user sets a system, an event occurs (sensor activates), a notification is sent to a user, and a user interacts with the system to verify status (a link to everything on the app) by video, by audio, or by other smart sensors, or the user phones a neighbour or other users.

A user may remotely respond with an activation depending on the outcome of a verification (a link to everything is on the app), e.g., ring bell, turn on lights, respond with audio, call police, capture video, unset the system, or ignore the event (e.g., a false alarm).

Figure 1:
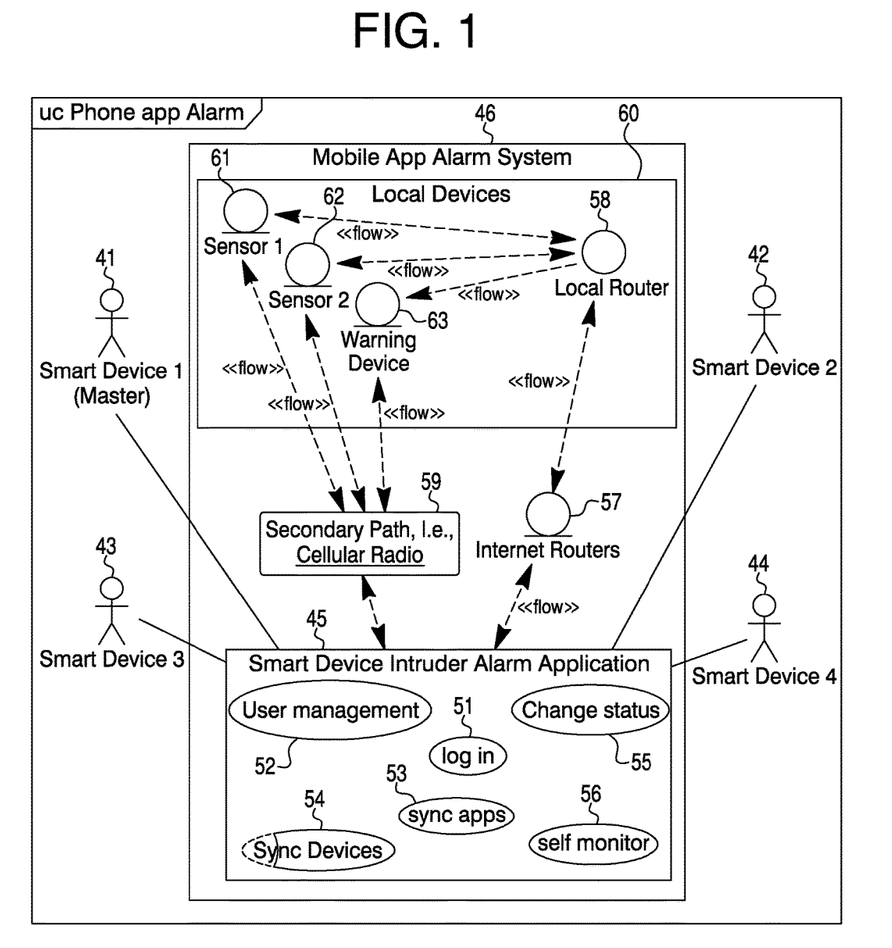
FIG. 1 is a diagram of a phone application alarm system.

FIG. 1 is a diagram of a phone application alarm. A smart device (master) 41, smart device 42, smart device 43 and smart device 44 may be connected to a smart device intruder alarm application showed by symbol 45 that is within mobile app alarm system as indicated by symbol 46. Within the smart device intruder alarm application of symbol 45 may be symbols 51, 52, 53, 54, 55 and 56 representing log in, user management, sync apps, sync devices, change state and self-monitor 56, respectively.

The smart device intruder alarm application at symbol 45 may be connected to Internet (or other network) routers at symbol 57, which can be connected to, for instance, a local router at a symbol 58 at a local devices area within a symbol 60. The application at symbol 45 may also be connected to a secondary path, such as a cellular radio, at symbol 59. The secondary path of symbol 59 may be connected to first and second sensors, represented by symbols 61 and 62, respectively, and a warning device represented by symbol 63. The sensors and warning device may be situated within the local devices area of symbol 60, which in turn is part of the mobile app alarm system of symbol 46. There may be more or less sensors including more or less warning devices in the local devices area. The sensors and warning device of symbols 61, 62 and 63, respectively, may be connected to the local router at symbol 58.

Figure 2:
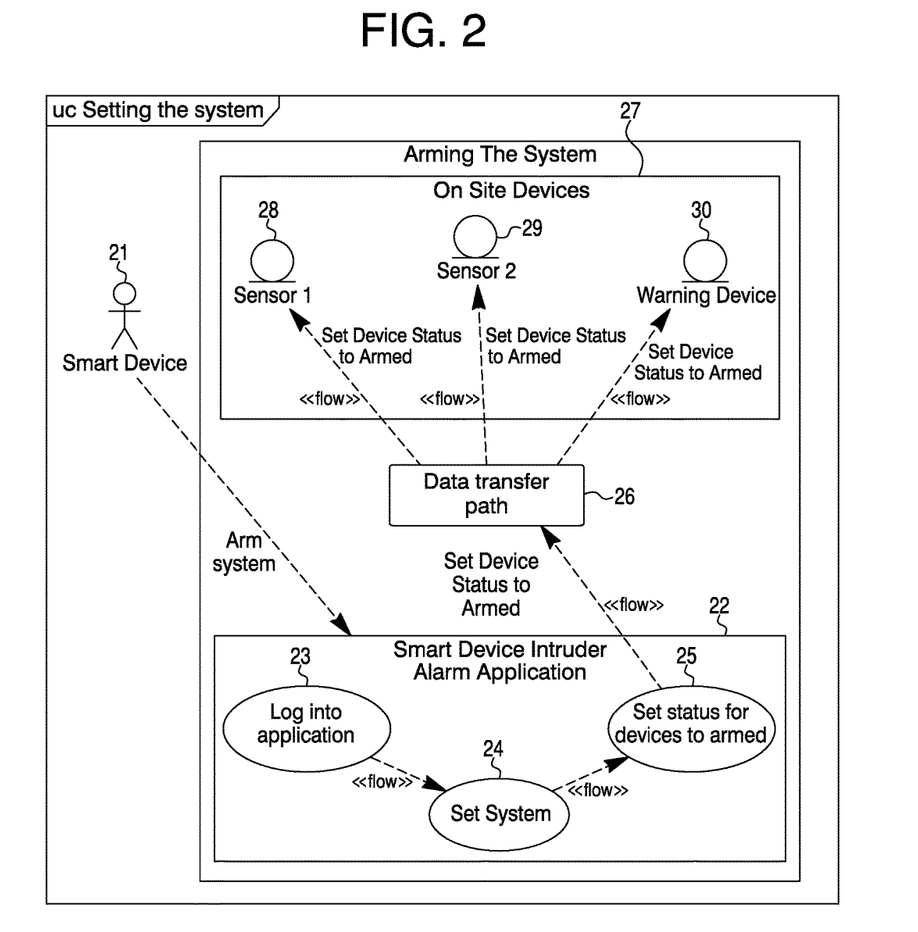
FIG. 2 is a diagram indicating a setting the present system.

FIG. 2 is a diagram indicating a setting the present system. Example of setting may be arming the system. A smart device (e.g., a mobile phone) 21 may send a signal or message indicating an arming the system may be sent to a smart device intruder alarm application 22. Application 22 may be logged into at symbol 23. Then the system may be set at symbol 24. A status may be set for devices in the system to be armed at symbol 25. Status of a device may be set to armed via a data transfer path at symbol 26. Path 26 may be connected with on-site devices in symbol 27. For instance, there may be a set device status to armed for sensor 28, sensor 29 and sensor 30.

Figure 3:
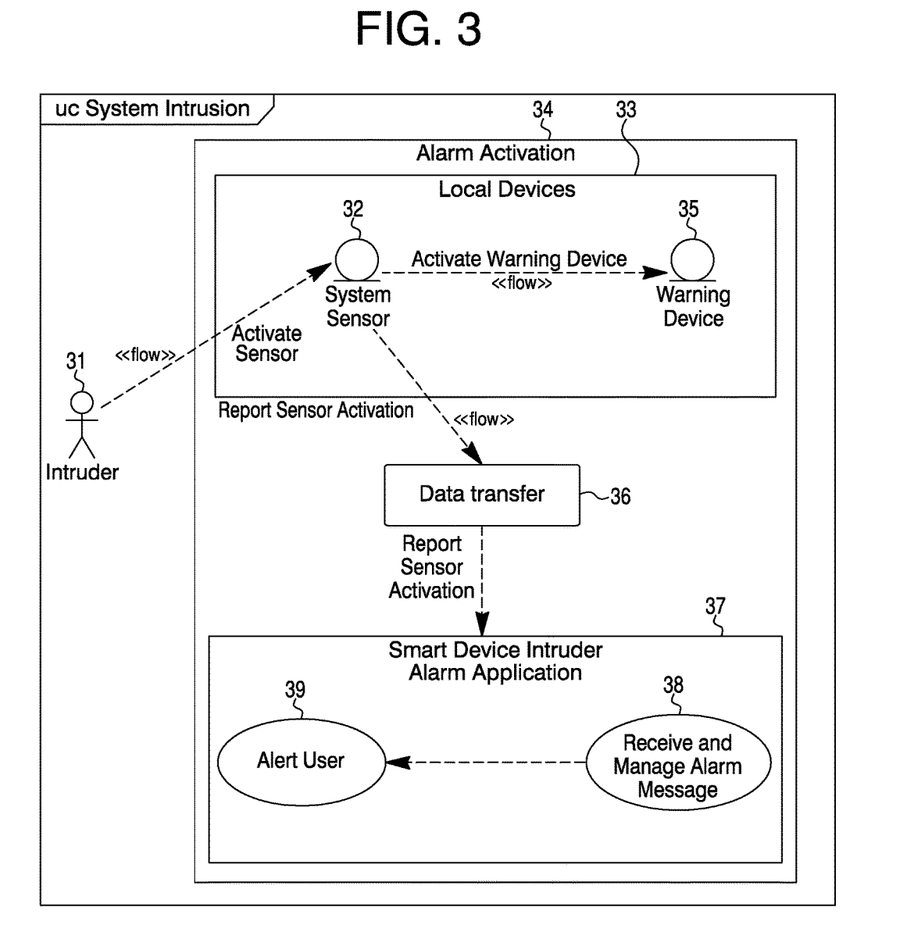
FIG. 3 is a diagram indicating a system intrusion.

FIG. 3 is a diagram indicating system intrusion. An intruder 31 may activate a system sensor 32 within a local device within symbol 33 which is within the alarm activation as indicated by symbol 34. Upon activation of system sensor 32 by intruder 31, a warning device 35 may be activated with a signal from system sensor 32. Also, a sensor activation may be reported with a signal from system sensor 32 via data transfer path as indicated by symbol 36 to a smart device intruder alarm application 37. An alarm message in application 37 may be received and managed at symbol 38 which is a result of the signal from data transfer path 36. A signal may proceed from symbol 38 which received and managed the alarm message, and go to alert a user at symbol 39 within the smart device intruder alarm application indicated at symbol 37.

FIG. 4 is a diagram of an example 61 of the present system. Example 61 is system logical overview, which may be theoretical without optimizations. Example 61 may have sensors 62 and 63 connected to smart phones 64 and 65. There may be another device connected to smart phones 64 and 65. An output may be also connected to phones 64 and 65. The sensors may also be regarded as detectors. Smart phones 64 and 65 may be connected to each other. This connection may be regarded as inter-smart device communication.

FIG. 5 is a diagram of example 61, like that of FIG. 4 but with a delineation of on-site devices 68 and off-site devices 69. On-site devices 68 may incorporate sensors 62 and 63, output 67 and one or more other devices 66. Off-site devices 69 may incorporate smart phones 64 and 65.

FIG. 6 is a diagram of an example 71 of the present system. Example 71 is a system overview, which may be physical. Sensors 62, 63 and 74 may be connected to a local site router 75. Output 67 may be connected to router 75. Incidentally, sensors 62, 63 and 74 might be Wi-Fi or any other wired or wireless connection. Local site router 75 may be connected to one or more Internet (or other network) routers 76. Smart phones 64, 65 and 77 may be connected to Internet (or other network) routers 76. Also, there may be a secondary path, such as cellular radio, that connects sensors 62, 63, and 74, and output 67 to the one or more Internet routers 76. There may be inter-smart device communication among smart phones 64, 65 and 77.

FIG. 7 is a diagram of an example 81 from a perspective of a smart devices where sensor and output communication is ignored. A smart phone 82 may be a primary device connected to tablets 83 and 84 which may be regarded as helper devices. The connections between smart phone 82 and tablets 83 and 84 may be regarded as optimized communication. Smart phone 82, as the primary device, may be connected to smart phones, which can be regarded as helper devices.

FIG. 8 is a diagram of an example 91 from a perspective of smart devices where sensor and output communication is ignored. Example 91 may incorporate an optional server 92. Smart phone 82, as a primary device, may be connected to tablets 83 and 84, which may have optimized communication. Smart phone 82 may also be connected to smart phones 85 and 86.

To recap, an alarm mechanism may incorporate one or more smart mobile devices having an alarm system application (app), local devices having one or more sensors, a warning device, and a local router connected to the one or more sensors and the warning device, and one or more Internet or other network routers connected to the local router, and to the alarm system app via the one or more smart mobile devices.

The alarm system application of the one or more smart devices may incorporate one or more items of a group having login, state change, sync device, sync apps, self-monitor and user management.

The mechanism may further incorporate one or more additional smart mobile devices. The one or more additional smart mobile devices may incorporate an alarm system application.

The mechanism may further incorporate a secondary connection path between the one or more sensors and the alarm system application via the one or more smart mobile devices and between the warning device and the alarm system application via the one or more smart mobile devices.

The secondary connection path may be a cellular radio.

An approach for providing security for an environment may incorporate connecting one or more sensors in a place, to the Internet or other network, connecting one or more mobile devices to the Internet or other network, and running a smart application on the one or more mobile devices for managing an alarm system. The alarm system may incorporate the one or more sensors, and the one or more mobile devices having a connection with the one or more sensors via the Internet or other network. The alarm system may be set or unset via the one or more mobile devices and the smart application.

The approach may further incorporate monitoring a change in state that may be acted on via the one or more mobile devices.

A change in state may be one or more items in a group incorporating an intrusion, a fire, a power outage, a burglary, a glass break, an explosion, movement of an object, and a sound.

The change in state may result in an action via the one or more mobile devices or be automatically selected from a group incorporating recording video and audio information of the change of state, ringing a bell, calling emergency health services, calling a fire department, calling a police department, and broadcasting a message to a site of the change of state.

The approach may further incorporate connecting additional one or more mobile devices to the Internet or other network. The additional one or more mobile devices may have one or more smart alarm applications, respectively, for managing the alarm system. Some of the one or more sensors in the environment, the mobile device and the additional one or more mobile devices may continuously synchronize with some of the other one or more sensors and the one or more mobile devices to provide some redundancy in processing the change of state.

Each smart alarm application may trigger a remote action in response to a change in state of the environment being monitored, that is communicated to other one or more mobile devices. The remote action may be for eliminating, rehabilitating, reducing and preventing harmful effects of the change in state to the environment.

A distributed security system may incorporate one or more sensors connected to the Internet or other network, and at least one smart device connected to the Internet or other network. The at least one smart device may run an alarm application (app).

The at least one smart device with the alarm app may permit a user to set and unset an alarm system, monitor the one or more sensors, monitor a change in a state of an event, have access to video and audio signals associated with the event, and take remote or local action relative to the event.

The system may be scalable based on a number of the one or more sensors and a number of smart devices.

Each of the one or more sensors and the at least one smart device may continuously synchronize with other sensors and other smart devices in the system for redundancy in processing. Each smart device with the app may trigger a remote action that is communicated to other one or more smart devices.

One or more of the one or more sensors may be an intrusion sensor. Each smart device may have up-to-date information about the alarm system.

A smart device that has control over the system may be a primary device. A smart device that has control over the system because a primary device cannot necessarily be accessed, may be a helper device.

A sensor of the one or more sensors may communicate with the alarm app of the at least smart device via the Internet or other network.

The system may be a self-monitored system.

An at least one smart device may be a primary device or a helper device. The primary device may monitor events from sensors, permit users with sufficient access rights to alter a configuration of the system, and add helper devices.

A helper device may provide backup in absence of a primary device. The backup may incorporate activities like that of the primary device except a determining the order of events in a presence of the primary device, and administrative control over the configuration of the system.

U.S. Pat. No. 8,179,256, issued May 15, 2012, is hereby incorporated by reference. U.S. Pat. No. 8,289,262, issued Oct. 16, 2012, is hereby incorporated by reference. U.S. Patent Application Publication No. 2013/0265799, published Oct. 31, 2013, is hereby incorporated by reference. U.S. Patent Application Publication No. 2014/0281742, published Sep. 18, 2014, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An alarm mechanism comprising:
one or more smart mobile devices having an alarm system application (app);
local devices comprising one or more sensors, a warning device, and a local router directly connected to each of the one or more sensors and the warning device; and
one or more Internet or other network routers connected directly to the local router, and to the alarm system app via the one or more smart mobile devices; wherein:
the one or more smart mobile devices is a primary device or a helper device; the primary device monitors events from sensors, permits users with sufficient access rights to alter a configuration of the system, and adds helper devices;
a helper device provides backup in absence of a primary device; and the backup comprises activities like that of the primary device except a determining the order of events in a presence of the primary device, and administrative control over the configuration of the system.

2. The mechanism of claim 1, wherein the alarm system application of the one or more smart devices comprises one or more items of a group comprising login, state change, sync device, sync apps, self-monitor and user management.

3. The mechanism of claim 2, further comprising:
one or more additional smart mobile devices; and
wherein the one or more additional smart mobile devices incorporate an alarm system application.

4. The mechanism of claim 1, further comprising a secondary connection path between the one or more sensors and the alarm system application via the one or more smart mobile devices and between the warning device and the alarm system application via the one or more smart mobile devices.

5. The mechanism of claim 4, wherein the secondary connection path is a cellular radio.

6. A method for providing security for an environment comprising:
connecting one or more sensors in a place directly a local site router and to an Internet or other network;
connecting one or more mobile devices to the Internet or other network; and
running a smart application on the one or more mobile devices for managing an alarm system; and
wherein the alarm system comprises:
the one or more sensors where each of the one or more sensors has internet connectivity capabilities; and
the one or more mobile devices having a connection with the one or more sensors via the Internet or other network; and
wherein the alarm system can be set or unset via the one or more mobile devices and the smart application; wherein:
the one or more mobile devices is a primary device or a helper device; the primary device monitors events from sensors, permits users with sufficient access rights to alter a configuration of the system, and adds helper devices;
a helper device provides backup in absence of a primary device; and the backup comprises activities like that of the primary device except a determining the order of events in a presence of the primary device, and administrative control over the configuration of the system.

7. The method of claim 6, further comprising monitoring a change in state that can be acted on via the one or more mobile devices.

8. The method of claim 6, wherein a change in state is one or more items in a group comprising an intrusion, a fire, a power outage, a burglary, a glass break, an explosion, movement of an object, and a sound.

9. The method of claim 8, wherein the change in state results in an action via the one or more mobile devices or be automatically selected from a group comprising recording video and audio information of the change of state, ringing a bell, calling emergency health services, calling a fire department, calling a police department, and broadcasting a message to a site of the change of state.

10. The method of claim 8, further comprising:
connecting additional one or more mobile devices to the Internet or other network; and
wherein:
the additional one or more mobile devices have one or more smart alarm applications, respectively, for managing the alarm system; and
some of the one or more sensors in the environment, the mobile device and the additional one or more mobile devices continuously synchronize with some of the other one or more sensors and the one or more mobile devices to provide some redundancy in processing the change of state.

11. The method of claim 10, wherein:
each smart alarm application can trigger a remote action in response to a change in state of the environment being monitored, that is communicated to other one or more mobile devices; and
the remote action is for eliminating, rehabilitating, reducing and preventing harmful effects of the change in state to the environment.

12. A distributed security system comprising:
one or more sensors connected to the Internet or other network; and
at least one smart device connected to the Internet or other network; and
wherein the at least one smart device runs an alarm application (app);

wherein:

the at least one smart device is a primary device or a helper device;

the primary device monitors events from sensors, permits users with sufficient access rights to alter a configuration of the system, and adds helper devices;

a helper device provides backup in absence of a primary device; and the backup comprises activities like that of the primary device except a determining the order of events in a presence of the primary device, and administrative control over the configuration of the system.

13. The system of claim 12, wherein the at least one smart device with the alarm app permits a user to set and unset an alarm system, monitor the one or more sensors, monitor a change in a state of an event, have access to video and audio signals associated with the event, and take remote or local action relative to the event.

14. The system of claim 12, wherein the system is scalable based on a number of the one or more sensors and a number of smart devices.

15. The system of 14, wherein:
each of the one or more sensors and the at least one smart device continuously synchronize with other sensors and other smart devices in the system for redundancy in processing; and
each smart device with the app can trigger a remote action that is communicated to other one or more smart devices.

16. The system of claim 15, wherein:
one or more of the one or more sensors is an intrusion sensor; and
each smart device has up-to-date information about the alarm system.

17. The system of claim 12, wherein:
a smart device that has control over the system is a primary device; and
a smart device that has control over the system because a primary device cannot be accessed, is a helper device.

18. The system of claim 12, wherein a sensor of the one or more sensors can communicate with the alarm app of the at least smart device via the Internet or other network.

19. The system of claim 12, wherein the system is a self-monitored system.

* * * * *